United States Patent Office 2,846,549
Patented Aug. 5, 1958

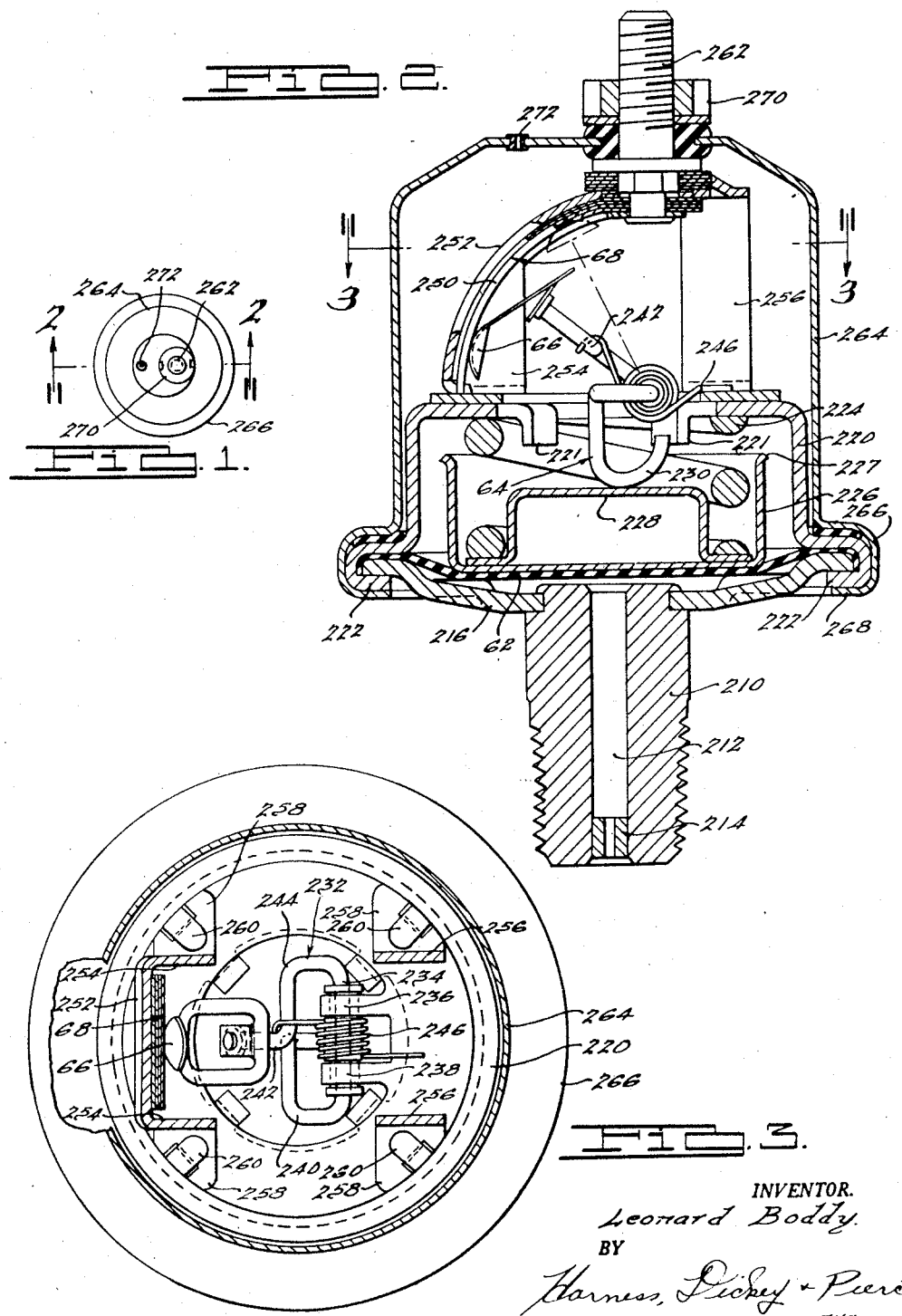

2,846,549

PRESSURE INDICATING DEVICE

Leonard Boddy, Ann Arbor, Mich., assignor to King-Seeley Corporation, Ann Arbor, Mich., a corporation of Michigan Original application August 5, 1949, Serial No. 108,773. Divided and this application December 20, 1954, Serial No. 476,506

7 Claims. (Cl. 201—48)

This invention relates to current modulating devices and more particularly to variable-impedance pressure measuring devices.

The object of this invention is to improve the accuracy and consistency of performance of pressure-sensitive devices.

A feature of this invention is an improved means for varying the value of a resistance as a function of the motion of a diaphragm.

Another feature of this invention is an improved variable resistance contact element.

The manner of accomplishment of the foregoing object, the nature of the foregoing features, and other objects and features of the invention, may be perceived from the following detailed description of embodiments of the invention when read with reference to the accompanying drawings in which:

Figure 1 is a top plan view of a pressure-sensing device embodying the principles of the present invention;

Fig. 2 is a sectional view taken substantially along the line 2—2 of Fig. 1; and Fig. 3 is a sectional view taken substantially along the line 3—3 of Fig. 2.

This application is a division of my application Serial No. 108,773, filed August 5, 1949, relating to Electrical Control Apparatus. That patent application issued as Patent No. 2,835,885 on May 20, 1958, with certain of the subject matter of that application being presented as a continuation application, Serial No. 658,888, filed May 13, 1957.

In general electrical systems are sometimes employed to indicate or gauge fluid pressures, particularly in the gauging of, for example, the oil pressure in an automobile engine. To this end, gauging systems have been devised which include a voltage source, the output of which is preferably reasonably closely regulated, an electrical gauge, and a resistor, the value of which varies as a function of the fluid pressure, for controlling the flow of current through the gauge. The gauge per se may be electromagnetic or electrothermal in nature.

Exemplary types of such gauging systems are disclosed in detail in the above-identified application and reference may be made thereto for a full understanding of an appropriate use for the variable-resistance device herein disclosed.

Referring now to the drawings, the disceclosed fluid pressure responsive unit comprises a threaded tubular body 210, having a bore 212 which may be and preferably is provided with a restricted section 214. Body 210 is, of course, adapted to be threaded into the oil system of the associated vehicle so that the bore 212 is in communication with the pressure fluid. Body 210 also serves as a grounding connection for the resistor 68. Body 210 is fixed to a dished circular member 216 which carries the previously mentioned flexible diaphragm 62. Diaphragm 62 is clamped between member 216, and a downwardly presenting cup-shaped spring housing member 220, which is assembled to the member 216 by inwardly turning the terminal flange thereof as indicated at 222. A coil spring 224 is caged between the base of member 220 and the base of an upwardly presenting spring cup 226. Cup 226 also carries a cup-shaped crank operating member 228, the upper surface of which has direct sliding contact with the reversely bent end 230 of crank 64. Preferably, the upper surface of member 228 is ground or otherwise finished to minimize the frictional resistance of this sliding movement.

Downwardly turned fingers 221 on member 220 and the rim 227 of cup 226 act as locators for spring 224. The rim 227 of cup 226 also acts as a limit stop for cup 226.

Preferably and as illustrated, the crank 64 is formed of a continuous length of rodlike stock, the intermediate body portion 234 of which is straight, and is rotatably journaled in spaced bearings 236 and 238 carried by member 220. One end of the straight body portion 234 is joined to the operating end 230, by the rebent portion 240. The other end of the straight portion 234 is joined to the contact operating end 242 by similarly rebent portions 244.

With the foregoing arrangement, it will be appreciated that the flexible diaphragm 62 serves simply as a fluid-tight seal between the bore 212 and the interior of the spring housing 220. Spring 224 continuously urges the spring 226 and element 228 downwardly. Crank 64 is provided with a torsion spring 246 which causes it to follow the downward movements of element 228. Fluid pressures introduced through the bore 212, of course, urge element 228 upwardly against the force of spring 224 and any such upward movements cause a corresponding upward movement of crank 64. The position of the crank 64 is, therefore, at all times a measure of the fluid pressure acting on the oil below the diaphragm 62.

The operating end 242 of crank 64, carries the previously identified contact 66 which has rubbing contact with the arcuately formed resistor 68. Contact 66 is, of course, grounded to the casing and body 210 through crank 64, spring 246, spring 224, member 220, and disk 216. Resistor 68 is wound on a mounting member 250, of arcuate form. Member 250 is held in place by an arcuate support 252 which forms one wall of an auxiliary housing member side wall portions 254 and 256. The side wall portions are provided with laterally turned notched feet 258, through which tongues 260 struck from the body of the spring housing 220 extend to secure these members in place. The upper end of the resistor 68 is electrically connected to the mounting stud 262, which is otherwise insulated from the housing structure. The lower end of resistor 68 may either be insulated from or grounded to the casing and the body 210. The outer casing 264 has a flared base 266, and is secured in place by inwardly turning the marginal flange portion 268 thereof. A nut 270 threaded on the terminal stud 262 completes the assembly. Preferably and as illustrated, the interior of the outer casing 264 is vented as indicated at 272. This vent may be and preferably is of the type that is self sealing in the event the associated liquid, such as oil, comes in contact therewith. Thus, if the diaphragm 218 fails, and thereby introduces a possibility of leakage through the unit, vent 272 automatically seals itself off, preventing this failure from causing a loss of the liquid.

While it will be apparent that the embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. A fluid pressure responsive current modulating means comprising a cup-shaped member, a flexible diaphragm cover for said member, means connected to said member and defining a chamber one wall whereof is constituted by said diaphragm, means defining a passage for admitting pressure fluid to said chamber, a spring acting between the base of said cup-shaped member and said diaphragm, a cup-like retainer for the end of said spring which bears against said diaphragm, and variable resistance means having relatively fixed and movable parts, the movable part being operatively responsive to movement of said spring retainer as influenced by pressures acting against said diaphragm.

2. In a current modulating device, a support surface, an actuating member, means for varying the position of said member relative to said support surface as a function of sensed variations in a physical condition, a crank comprising a rod bent to define a body portion and two arm portions, bearing means supported upon said support surface and surrounding a portion of said body portion for supporting said body portion for rotational motion about the longitudinal axis of said body portion, means including one of said arm portions for rotating said body portion under the control of said actuating member, a resistor, and means including the other one of said arm portions movable by said body portion for varying the effective resistance value of said resistor.

3. In a current modulating device, a support surface, an actuating member, means for varying the position of said member relative to said support surface as a function of sensed variations in a physical condition, a crank comprising a rod bent to define a body portion and two arm portions disposed at opposite ends of said body portion and extending at angles to the longitudinal axis thereof, bearing means supported upon said support surface and surrounding a portion of said body portion for supporting said body portion for rotational motion about an axis passing through said body portion, means including one of said arm portions for rotating said body portion under the control of said actuating member, a resistor, and means including the other one of said arm portions movable by said body portion for varying the effective resistance value of said resistor, said other arm portion being bendable to adjust the relationship between said contact and said resistor at a selected position, said one arm portion being bendable to adjust the relative amplitudes of motion of said contact and said actuating member.

4. A fluid pressure responsive current modulating means comprising a cup-shaped member, a flexible diaphragm cover for said member, means connected to said member and defining a chamber one wall whereof is constituted by said diaphragm, means defining a passage for admitting pressure fluid to said chamber, a spring acting between the base of said cup-shaped member and said diaphragm, a cup-like retainer for the end of said spring which bears against said diaphragm, a resistance element, a contact engaging said element, a crank member actuated by said spring retainer, and resilient means connecting said contact to said crank member.

5. A fluid pressure responsive current modulating means comprising a cup-shaped member, a flexible diaphragm cover for said member, means connected to said member and defining a chamber one wall whereof is constituted by said diaphragm, means defining a passage for admitting pressure fluid to said chamber, a spring acting between the base of said cup-shaped member and said diaphragm, a cup-like retainer for the end of said spring which bears against said diaphragm, a resistance element, a contact engaging said element, a crank member actuated by said spring retainer, and resilient means connecting said contact to said crank member, said resilient means comprising a pair of spring arms interconnected by a cross-member, means connecting said cross-member to said crank, and means securing said contact to said spring arms.

6. A fluid pressure responsive current modulating means comprising a cup-shaped member, a flexible diaphragm cover for said member, means connected to said member and defining a chamber one wall whereof is constituted by said diaphragm, means defining a passage for admitting pressure fluid to said chamber, a spring acting between the base of said cup-shaped member and said diaphragm, a cup-like retainer for the end of said spring which bears against said diaphragm, a crank comprising a body portion and two arm portions, means rotatably supporting said body portion, means including one of said arm portions for rotating said body portion under the control of said spring retainer, a resistor, and means including the other one of said arm portions movable by said body portion for varying the effective resistance value of said resistor.

7. A fluid pressure responsive current modulating means comprising a cup-shaped member, a flexible diaphragm cover for said member, means connected to said member and defining a chamber one wall whereof is constituted by said diaphragm, means defining a passage for admitting pressure fluid to said chamber, a spring acting between the base of said cup-shaped member and said diaphragm, a cup-like retainer for the end of said spring which bears against said diaphragm, a crank comprising a body portion and two arm portions, means rotatably supporting said body portion, means including one of said arm portions for rotating said body portion under the control of said spring retainer, a resistor, and means including the other one of said arm portions movable by said body portion for varying the effective resistance value of said resistor, said other arm portion being bendable to adjust the relationship between said contact and said resistor at a selected position, said one arm portion being bendable to adjust the relative amplitudes of motion of said contact and said spring retainer.

References Cited in the file of this patent

UNITED STATES PATENTS

| | | |
|---|---|---|
| 2,226,441 | Paul | Dec. 24, 1940 |
| 2,243,807 | Malone | May 27, 1941 |
| 2,286,717 | Clason | June 16, 1942 |
| 2,373,292 | Clason | Apr. 10, 1945 |
| 2,423,609 | Middleton et al. | July 8, 1947 |
| 2,485,433 | Crum | Oct. 18, 1949 |